US007133414B2

(12) United States Patent
Archacki, Jr.

(10) Patent No.: US 7,133,414 B2
(45) Date of Patent: Nov. 7, 2006

(54) METHOD FOR ENHANCING BROADCAST MESSAGE COMMUNICATIONS

(75) Inventor: Raymond J. Archacki, Jr., Wethersfield, CT (US)

(73) Assignee: Carrier Corporation, Farmington, CT (US)

( * ) Notice: Subject to any disclaimer, the term of this patent is extended or adjusted under 35 U.S.C. 154(b) by 16 days.

(21) Appl. No.: 10/797,990

(22) Filed: Mar. 11, 2004

(65) Prior Publication Data

US 2005/0201312 A1 Sep. 15, 2005

(51) Int. Cl.
*G06F 11/00* (2006.01)
*H04J 3/16* (2006.01)

(52) U.S. Cl. ...................... 370/465; 370/230; 370/312; 455/517; 340/825.44

(58) Field of Classification Search ................ 370/449, 370/310, 216, 230, 465, 474, 312; 455/517, 455/556, 557; 340/825.44; 450/517
See application file for complete search history.

(56) References Cited

U.S. PATENT DOCUMENTS

| | | | | |
|---|---|---|---|---|
| 5,596,318 | A * | 1/1997 | Mitchell | 340/7.22 |
| 6,014,429 | A * | 1/2000 | LaPorta et al. | 379/88.15 |
| 6,266,513 | B1 * | 7/2001 | Briancon | 340/7.22 |
| 6,842,461 | B1 * | 1/2005 | Harris | 370/465 |
| 6,895,014 | B1 | 5/2005 | Simbirski et al. | |
| 2003/0073461 | A1 * | 4/2003 | Sinclair | 455/557 |

* cited by examiner

*Primary Examiner*—Afsar Qureshi
(74) *Attorney, Agent, or Firm*—Wall Marjama& Bilinski LLP

(57) ABSTRACT

The effectiveness of a communication system for broadcasting curtailment messages to comfort system thermostats is enhanced by conducting an initial test broadcast for the purposes of compiling a list of those users that did not receive the test broadcast. This list is then used in combination with a later broadcast of a curtailment message to also send the curtailment message to those individuals on the list by a more robust communication system to ensure that a greater number of users will receive the broadcast message.

20 Claims, 2 Drawing Sheets

METHOD FOR ENHANCING BROADCAST MESSAGE COMMUNICATIONS

BACKGROUND OF THE INVENTION

This invention relates generally to wireless broadcast communications and, more particularly to a method of improving communications between a central control location and a plurality of remote devices.

The management of peak energy demand has long been an issue for utility companies. Load management has been extensively practiced for years with high usage, industrial and heavy commercial customers and more recently with small commercial and residential customers.

Without a central energy management system, the individual homes and businesses will generally set their thermostats at a fixed position that will assure them of a comfortable temperature in the spaces to be heated or cooled. However, it has been recognized that small changes in these temperature demands (i.e. on the order of 2 to 4°), will make very little difference to the individual user of the comfort system but will make a tremendous difference to the utility company during periods of high demand. That is, during periods of unusually high electric demand, the power company can send out a wireless broadcast signal to its user thermostats to adjust (i.e. set-back) the thermostat temperatures by a few degrees from the standard setting and then return it to the existing setting when the power emergency is over. In this way, the homeowner will be slightly inconvenienced, but the resulting reduction in energy usage could eliminate price spikes and help curb blackouts and brownouts.

The communication that is necessary between the utility company and the energy users is critical for the purposes of 1) ensuring that the set-back signals are received by the users and 2) to inform the utility if and when the set-back condition has occurred. One approach is that of sending individual messages to each and every device. While effective, this approach is much too time consuming, both in the sending of the set-back messages to the user and in receiving acknowledgment from the user.

Another approach is that of having each of the user devices being programmed to listen to a particular wireless broadcast channel assigned for that utility, and then broadcasting the set-back messages by way of a single transmission. The problem with broadcast messages is that, unlike an individual message addressed to a particular device, the broadcast message is simply sent out without any acknowledgment of receipt or any mechanism for retry. This makes the broadcast message less effective then the individual message because not all of the devices will "hear" the broadcast message even though they may be able to "hear" the individual message.

While it is possible to broadcast a set-back message and have the individual users acknowledge receipt by way of their two way communication capability, the ability to handle those acknowledgment responses is proportionately limited by the total number of installed devices. That is, since there is no way to simultaneously receive and record all of the various acknowledgment responses instantly, it is necessary to spread out or stagger those responses over a period of time proportionate to the number of installed devices in order for them to be received and recorded. This is due to bandwidth limitations of the underlying wireless communications (i.e. the number of simultaneous messages that can be handled by a transceiver). For example, with a user base numbering in the range of twenty-five thousand, the responses must necessarily be spread out over a period of two hours. While this substantially hinders the utility's ability to monitor the responses, the overall effectiveness of the broadcast message (i.e. the actual number of installed devices that "hear" the message) is the most critical measure of success for the utility. The larger the number of devices that "hear" the broadcast set-back message, the greater the reduction in energy demand.

SUMMARY OF THE INVENTION

Briefly, in accordance with one aspect of the invention, a test message is broadcast to a group of remote devices that are programmed to receive on that broadcast channel. For those devices that receive the broadcast message, an acknowledgment is sent to the utility database, which then records those devices that have received the message and those that have not received the message. This database provides an indication of individual device capability which is then later used in sending out an actual message to all devices such as, in the case of remote comfort systems, a set-back broadcast message.

When an actual message such as a set-back broadcast is sent, those devices that did not acknowledge receipt of the test message are presumed to have not received the broadcast message and are sent individual messages with the set-back information. In this way, the utility is assured that the set-back message has been received, on a timely basis, by a high percentage of the users.

By another aspect of the invention, the process of sending out a test message, recording the devices that acknowledge receipt and those who don't, and thereby providing an indication of device capability, is updated periodically to take into account changes in atmospheric conditions, solar flares, RF noise and other disturbances that may prevent the remote devices from receiving a broadcast message.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
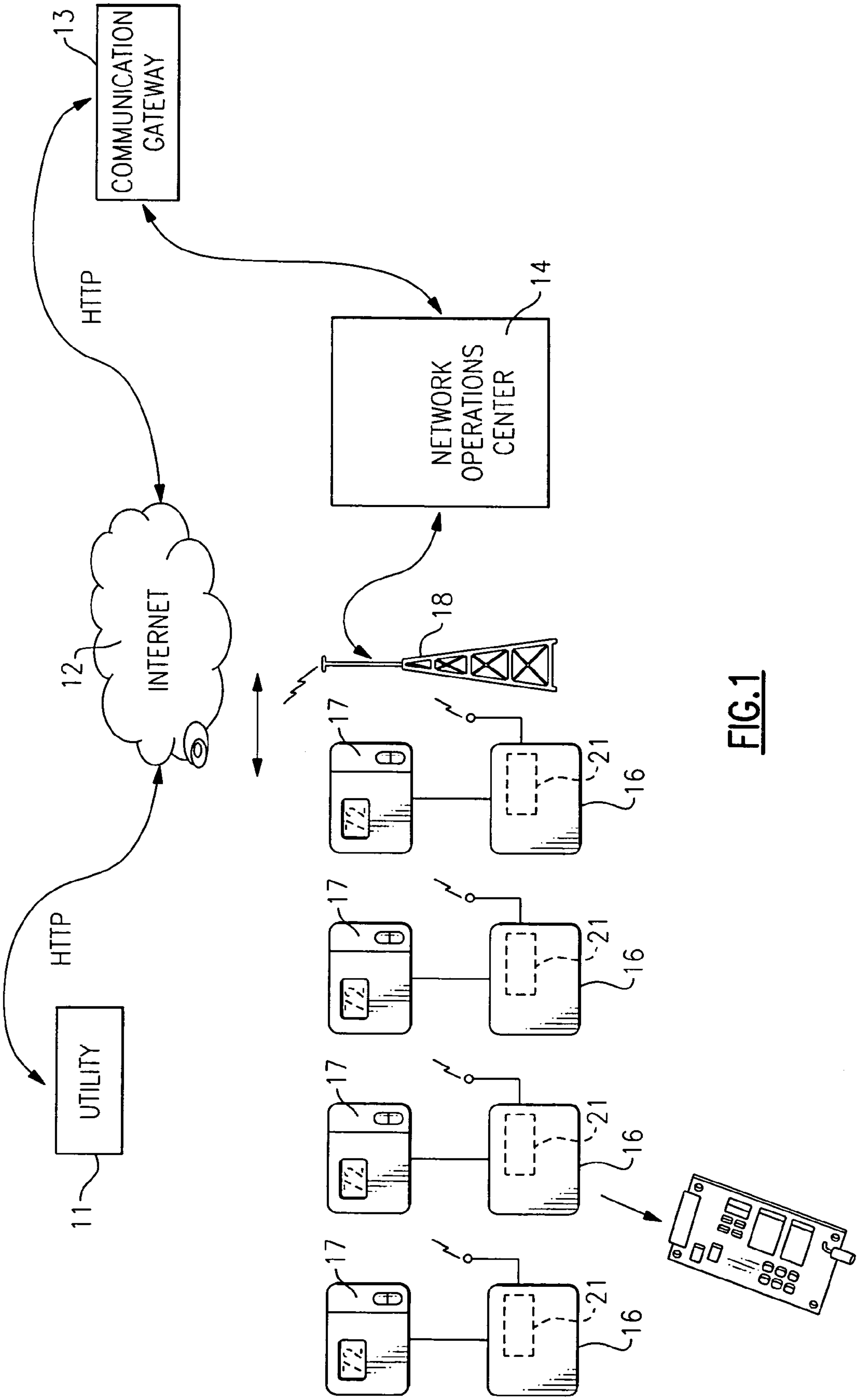
FIG. 1 is a schematic illustration of an energy management communication system.

Referring now to FIG. 1 there is shown an internet-based demand side management system for energy providers. Here, a power utility company 11 communicates through the internet 12, a communication gateway 13 and a wireless network operations center 14 with a group of remote comfort system users 16 having specially programmed thermostats 17.

The utility company 11 monitors the demand for power and during times of unusually high electric power demand, they send out a message by the internet 12, the communication gateway 13 and the wireless network operations center 14 to the group of comfort system users 16 to appropriately curtail (i.e. set-back) the temperature set point of the thermostat 17 over a given time period for the purposes of conserving power over that time period. The curtailment command from the utility 11 is received by the communication gateway 13 which connects via a wireless communication transfer protocol to the wireless network operations center 14, which then uses industry standard ReFlex 2-way wireless protocol to broadcast the message to all devices by way of a satellite system and one or more communication towers 18. Each of the comfort system users 16 has an antenna 19 that picks up the broadcast message and a pager 21 that is programmed with the broadcast address to receive the message. The curtailment set-back message then operates to automatically adjust the thermostat setting to one which is require less power. The user may choose to override the power company initiated curtailment command so as to leave the thermostat setting at its initial setting. In either case, each of the users 16 will automatically respond back through the two-way wireless protocol to the utility company 11 that they have received the curtailment command. Because of the large number (i.e. in the ten of thousands), the individual user systems are programmed to spread out their confirmation responses to avoid overloading the system. That is, for the utility 11 to receive responses from the entire network, it may take on the order of one to two hours. Of course, there will be some of the users 16 that do not receive the curtailment command. Experience has shown that the confirmation rate of a broadcast message is in the range of 90–95% of total users 16. Because of the relatively long response time, by the time that the utility 11 is made aware of which of the users 16 did not receive the curtailment command, it is generally to late too rebroadcast the command or to communicate to those users in another manner.

Figure 2:
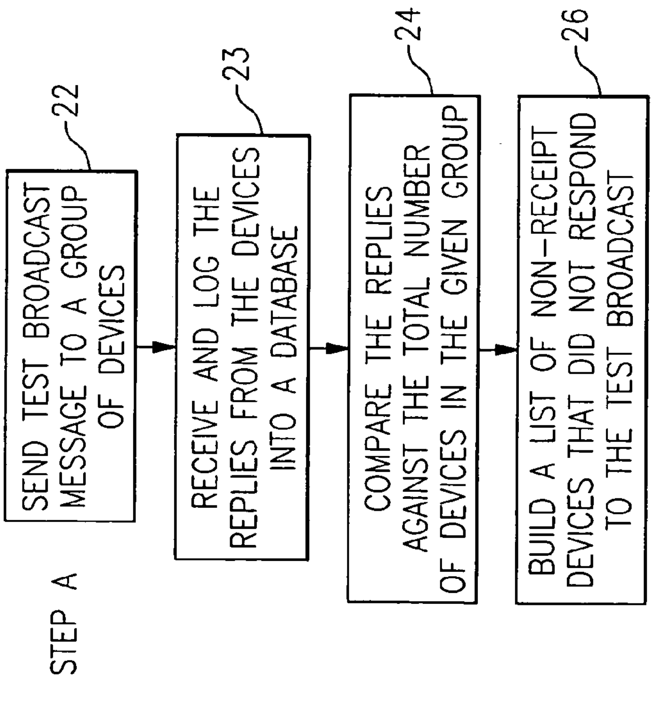
FIG. 2 is a flow chart showing the sequence of steps in establishing the performance criteria in a communication system between a central control location and a plurality of remote devices.
Figure 3:
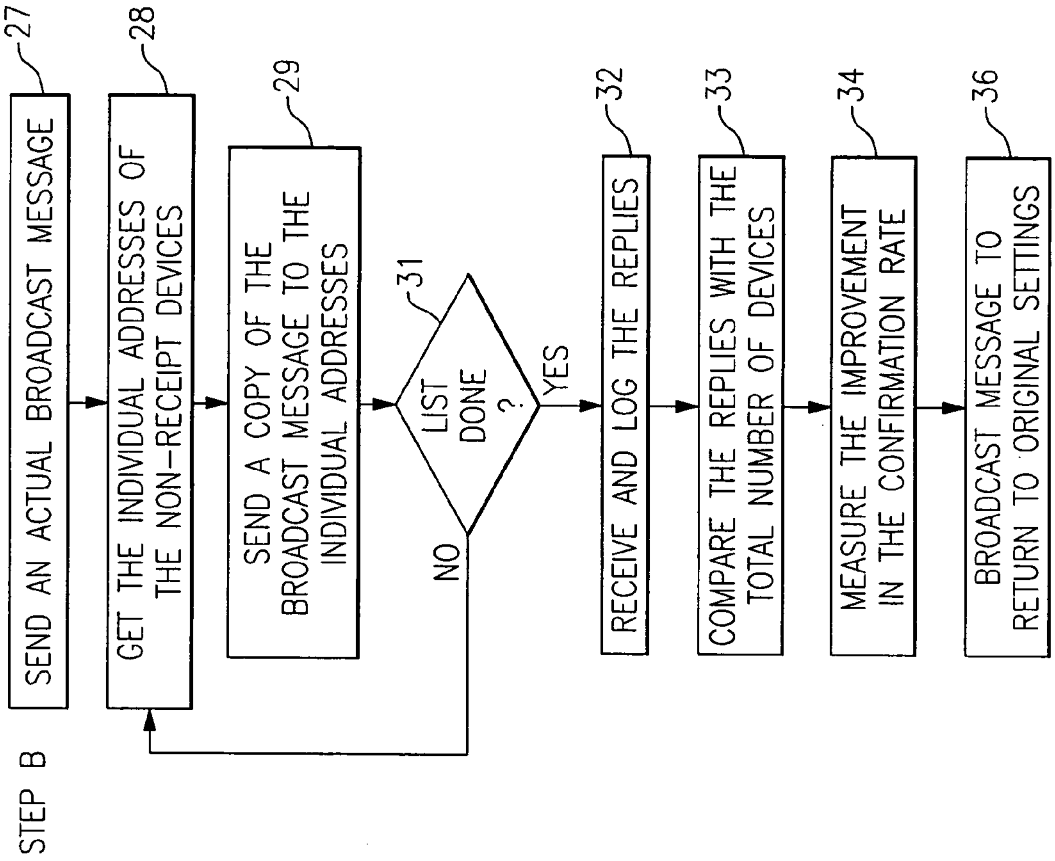
FIG. 3 is a flow chart showing the steps in a process of transmitting actual messages between a central control location and a plurality of remote devices.

In accordance with one aspect of the present invention, the ability of the wireless devices to receive and confirm the receipt of broadcast messages is enhanced by way of a preliminary process as set forth in FIG. 2 and then to modify the user broadcast message process as shown in FIG. 3.

The test broadcast message is sent to the group of user devices that are programmed to receive on that broadcast channel. This is shown in step 22 of FIG. 2. In step 23, each of the replies from the devices that have received the test message are received and logged. In step 24, the number of received acknowledged replies are then compared against the total number of devices in the group in order to obtain the performance rate for the communication system. This, traditionally, is on the order of 90 to 95%. The next step as shown in block 26 is to build a list of non-responding devices that did not respond to the test broadcast. It is this list of devices or users that is then treated individually in the next group of process steps as shown in FIG. 3.

It should be recognized that during the test procedures as described in FIG. 2, the total time that elapses during the reply process is not critical since those steps are conducted for the purpose of obtaining the number and identities of the non-responding devices and are not involved in an actual broadcast of a curtailment command which takes place in the FIG. 3 process.

In step 27, an actual curtailment command messages is broadcast in a manner described with reference to FIG. 1. Although it is broadcast in a manner so as to be available for receipt by each of the many comfort system users 16, it is now anticipated that those non-responding devices that resulted from the test process as described with respect to FIG. 2, will not receive the broadcast message. Accordingly, that list is accessed in step 28, and in step 29, a curtailment command message is sent to the individual address of those particular users 16. This ensures a higher probability of message delivery because an individually addressed message uses a more robust version of the wireless protocol that requires specific acknowledgements and contains mechanisms for multiple retries. This is opposed to a broadcast message where there are no acknowledgments or retries. While it is recognized that more time will be involved in the sending of the individual messages, experience has shown that it typically involves only 5–10% of the installed devices and it is a necessary step in order to overcome the problem of those devices not being above to receive the broadcast message.

In step 31, the curtailment set-back message will continue to be sent until it has been sent to each of those non-responding devices. In this way, the curtailment set-back message will quite reliably have been sent to all of the user devices in a very short time period without the need for having received an acknowledgement response.

Having gotten the message out to the devices, the usual process of receiving and logging the replies indicating receipt by the devices is then accomplished in step 32. Again, this will take a considerable period of time, but that time is of no concern to the process. In step 33, the number of acknowledged receipt replies is then compared to the total number of devices to determine the performance level of the communication system. It has been found experimentally that, with a modified process as described hereinabove, the success rate can be substantially improved to about 98–99% confirmations. In step 34, the improvement margin is measured by subtracting the earlier rate as obtained in step 24.

After the specified time in the set-back message the user thermostats 17 will revert to their originally programmed settings prior to the set-back. Alternatively, if the emergency power situation has abated earlier, the utility company can then send out another broadcast message to cause the thermostats 17 to return to their original settings. In order to ensure that the non-responding devices receive this message, it is again preferred that those users be contacted individually as described hereinabove so that the thermostats 17 can be returned to their original settings. However, this adjustment is not as critical to the utility company as the earlier adjustment wherein the thermostats are placed in a set-back condition.

Referring to Table 1 below, the performance results of the communication system is shown both before and after the process is modified as described hereinabove. With a primary group of 4486, the initial test broadcast resulted in 4194 responses indicating receipt, to thereby provide a 93.5% confirmation rate. Using the modified approach to send individual messages to the 292 devices that were indicated as being of a “non-responding” type, there were 225 of those users that replied with receipt being acknowledged. With this result, the total reply confirmation amounted to 4419 users, to provide a total confirmation rate of 98.5%. The process therefore resulted in a 5% improvement over the non-modified process.

TABLE 1

| Group # | Total Devices | Broadcast Reply Confirmations | BC Confirm % | Devices sent Individual Messages | Individual Message Replies | Total Reply Confirmations | Total Confirm % |
|---|---|---|---|---|---|---|---|
| 1-Primary Group | 4486 | 4194 | 93.5% | 292 | 225 | 4419 | 98.5% |

It is important to understand that the ability to send wireless signals to fixed devices associated with comfort systems is handicapped because the devices are not mobile like other wireless applications. That is, in a mobile paging system, the user moves in and out of areas with good wireless coverage and the message can usually be delivered once the user is located in a strong signal area. However, with a fixed device may receive and send reply confirmations one day, yet not be able to receive and reply on another day in an area on the outer fringe of the coverage region. The present method therefore provides a dynamic method to send a test broadcast and then the actual broadcast to obtain the best possible data from the system about which devices are not in coverage at that time. It is thus preferable to conduct the test broadcast process to update the list of non-receipt devices as often as possible. However, recognizing that this adds considerably to the operational cost, the frequency of these test broadcast can be reduced with the understanding that there will be an associated reduction in overall performance. With this in mind, it has been determined that a reasonable basis of operation is to perform the test broadcast about once a month so that the list of non-responding devices can by updated on a reasonably frequent basis.

While the present invention has been particularly shown and described with reference to a preferred embodiment as illustrated in the drawings, it will be understood that one skilled in the art that various changes in detail may be effected therein without departing from the spirit and scope of the invention as defined by the claims. For example, although the invention has been described in terms of an energy provider communication with users of comfort systems, it may just as well be applicable to any type of central control entity that is communicating by broadcast message to remote devices.

I claim:

1. A method of controlling from a central location a plurality of remote devices having two-way wireless communication capabilities with the central location and being programmed to receive broadcast messages from the central location, comprising the steps of:
- sending a test broadcast message from the central location to said plurality of remote devices;
- from those remote devices that receive said test message, sending an acknowledgment message;
- determining by subtracting those who have sent an acknowledgement message from said plurality of remote devices, which of said plurality of remote devices that did not receive said test message;
- sending an actual broadcast message to said plurality of remote devices; and
- sending by other than broadcasting, a copy of said actual broadcast message to those remote devices that did not receive said test message.

2. A method as set forth claim 1 wherein said plurality of remote devices each include a thermostat whose setting can be changed by a broadcast message.

3. A method as set forth in claim 2 wherein said actual broadcast message is effective to curtail the temperature setting of said thermostat.

4. A method as set forth in claim 3 and including the further process of sending another actual broadcast message to remove the curtailment command.

5. A method as set forth in claim 1 wherein the central location is a site that is accessible to a power utility company via the internet with password protected access.

6. A method as set forth in claim 1 wherein the actual message operates to automatically adjust a thermostat temperature setting in said remote device.

7. A method as set forth in claim 1 and including an intermediate step of comparing the number of those devices that received said test message with the total number of devices to indicate a level of test message performance.

8. A method as set forth in claim 7 and including the step of comparing the number of those devices receiving said actual broadcast message with the total number of devices to obtain an indication of actual broadcast message performance.

9. A method as set forth in claim 8 and including the step of comparing test message with performance with actual broadcast message performance obtain a level of performance improvement.

10. A process of communicating between an energy providing utility and a group of energy users having discretion as to the amount of energy demanded from the utility, comprising the steps of:
- broadcasting a test message which each of the group of users is capable of receiving;
- for each user that receives the broadcast test message, replying to indicate that the test message has been received;
- by subtracting those replying from said group of users, compiling a list of those users that did not reply to indicate receipt of the test message;
- broadcasting to each of the group of users, a curtailment command to adjust the energy demand from each user; and
- for those users in the compiled list, sending the curtailment command to each using individually addressed messages.

11. A process as set forth in claim 10 wherein said energy users are users of a comfort system having a thermostat whose demands settings can be modified.

12. A process as set forth in claim 11 wherein the steps of broadcasting a test message, replying to indicate receipt, and compiling a list of those users that did not reply is periodically conducted so as to update the list of those users that did not reply.

13. A process as set forth in claim 11 and including an additional step of broadcasting a message to remove the curtailment command.

14. A process as set forth in claim 10 wherein the step of replying is by way of a wireless communication method.

15. A system of communication between a central location and a plurality of remote devices having two-way wireless communication capabilities with the central location, comprising:

means for programming the remote locations for receiving broadcast messages from the central location;

means for sending a test message from the central location to the plurality of remote devices;

means for sending an acknowledgement message to the control location from those remote devices that received said test message;

means for determining at the central location, by subtracting those that have sent an acknowledgement message from said plurality of remote devices, those remote devices that did not receive said test message;

means for sending an actual broadcast message to the plurality of remote devices; and means for sending by other than broadcasting, a copy of said actual broadcast message to those remote devices that did not receive said test message.

16. A system as set forth in claim 15 where said plurality of remote devices each include a thermostat with settings that can be changed by a broadcast message.

17. A system as set forth in claim 16 wherein said actual broadcast message is effective to change a temperature setting of said thermostat.

18. A system as set forth in claim 15 wherein the central location is a site that is accessible to a power utility company via the internet with password protected access.

19. A system as set forth in claim 15 and including means for comparing the number of those devices that received said test message with the total number of devices to indicate a level of test message performance.

20. A system as set forth in claim 19 and including means for comparing the number of those devices receiving the actual broadcast message with the total number of devices to obtain an indication of actual broadcast message performance.

* * * * *